Patented Apr. 21, 1942

2,280,097

UNITED STATES PATENT OFFICE 2,280,097

WINDOW AND THE LIKE

William Henry Moss, London, England, assignor to Celanese Corporation of America, a corporation of Delaware No Drawing. Application January 31, 1939, Serial No. 253,311. In Great Britain February 8, 1938

12 Claims. (Cl. 2—14)

This invention relates to windows and the like and especially to respirator eye-pieces and other transparent closures which are required to remain transparent under conditions in which they would normally become obscured by the condensation of moisture upon them, and to composite sheet material adapted to form such closures. The invention includes the production of such sheet material.

Respirator eye-pieces are subjected in use to a moist, warm atmosphere on the inner side and to a colder atmosphere on the outer side. In consequence they tend to become obscured by the condensation of moisture on the inside. In U. S. application S. No. 225,570 filed August 18, 1938, I have indicated how this disadvantage can be overcome by forming at least that surface of the eye-piece which is liable to become fogged, of a cellulose acetate which has been made by hydrolysing a primary cellulose acetate considerably beyond the inception of acetone-solubility until it becomes soluble in acetone diluted to a considerable extent with water while still insoluble in, and not unduly swollen by, liquid water. Such a cellulose acetate is found to be capable of absorbing water vapour. This property together with the property of being insoluble in, and not unduly swollen by, liquid water are to be regarded as connoted by the term "hydrotropic" as used herein. The invention is not concerned with small differences in water resistance such as are of no commercial utility. Thus for a sheet material to be regarded as "hydrotropic" it should at least be capable of being held close to the mouth and breathed upon several times without dimming where a "water-resistant" material should under the same conditions become fogged. The degree of resistance to swelling called for in the hydrotropic material is sufficient merely to prevent buckling of the composite sheet material under the conditions of use.

The composite sheet material of the invention comprises a basic sheet of a water-resistant cellulose acetate or other film-forming polymeric ester of ether and adherent thereto, an outer sheet of a cellulose acetate, or other film-forming polymeric ester or ether, which is hydrotropic.

The hydrotropic cellulose acetate for surfacing the eye-piece or the like may be made, for example, by treating a primary cellulose acetate solution in acetic acid made by the usual acetylation process using sulphuric acid as the acetylation catalyst, for a prolonged period with water until it attains solubility in a 50% aqueous solution of acetone. The cellulose acetate may then be dissolved in aqueous acetone, preferably together with a small proportion of ethyl lactate, diacetone alcohol or other high or medium boiling solvent. From this solution a sheet or foil may be formed which may be caused to adhere to a sheet of ordinary cellulose acetate of the desired dimensions by the application of pressure in the presence of a suitable solvent for either the hydrotropic or the water-resistant material, for example in the case of cellulose acetate acetone. The adhesion may be effected by the combined action of heat and pressure using, e. g. instead of a true solvent a liquid which becomes a solvent at elevated temperatures, e. g. 80% aqueous ethanol or methanol in the case of cellulose acetate. Or assisting liquids may be dispensed with but it is then more difficult to secure good adhesion. Instead of forming a sheet or foil of the hydrotropic cellulose acetate, on a separate film-forming surface the sheet or foil may be formed on the basic sheet, e. g. by spraying or casting methods. This method is to be preferred when the outer sheet is to be of small thickness e. g. of the order of 0.01" or less. The basic sheet may be surfaced on one or both sides with the hydrotropic cellulose acetate. With a view to assisting the eye-piece to retain its shape and flatness in spite of varying conditions of moisture it is of advantage to surface both sides.

The basic sheet can be made by flowing or extruding a composition containing the water-resistant cellulose acetate and a plasticiser dissolved in a volatile solvent on to a travelling film-forming surface, for example the surface of an endless driven metal band, and effecting evaporation of the volatile solvent during the travel of the band or other surface. The foil or sheet of hydrotropic cellulose acetate for surfacing the basic sheet may be formed in a similar way. This method is most suitable when a thin composite sheet is required. Thicker sheets can be cut from a block made by compressing a moulding powder containing the cellulose acetate and plasticisers and the like in a heated block press. An alternative method of forming the basic sheet is to build it up by spraying on to a suitable surface a solution of the cellulose acetate, which may with advantage contain, in addition to the volatile solvent and the plasticiser for the cellulose acetate, one or more high boiling solvents for the cellulose acetate, for example diacetone alcohol or ethyl lactate, and one or more medium boiling non-solvents, for example methanol or ethanol. In a similar way the outer sheet can be formed; or, as indicated above, this may be formed in situ by spraying on to the basic sheet a solution of the hydrotropic material in a volatile solvent therefor.

A convenient thickness for the surfaced sheet from which eye-pieces or the like can be cut is between 0.005" and 0.015", for example 0.007" to 0.011". Thus, for example, the basic layer may conveniently have a thickness of 0.004" to 0.006" and may be surfaced on both sides with a foil or coating of hydrotropic cellulose acetate of thickness from 0.001" to 0.002" or 0.003"; or a somewhat thicker foil, sheet or coating of hydrotropic cellulose acetate, for example of thickness 0.003" to 0.005", may be applied to one side only. The surfacing layer has been referred to above as a foil, while the basic layer has been referred to as a sheet but it is not essential for the surfacing layer or layers to be thinner than the basic layer and the invention includes material comprising two relatively thick surfacing layers of hydrotropic cellulose acetate reinforced with a thinner layer of water-resistant cellulose acetate.

The water-resistant cellulose acetate for forming the basic or reinforcing sheet should preferably have been made by acetylation under such conditions that degradation of the cellulose molecule is substantially avoided, followed by ripening to acetone-solubility, for example to an acetyl value of 51 or 52 to 53 or 54% calculated as acetic acid. With a view to avoiding substantial degradation of the cellulose during acetylation the temperature should be carefully controlled and it is of advantage to carry out acetylation in the presence of a large excess of inert diluent, for example acetic acid, with a view to obtaining maximum tenacity, clarity and stability in the final product. Halides of amphoteric metals, for example ferric chloride or zinc chloride, can be used as acetylation catalysts in place of sulphuric acid. The acetylation product may be ripened in solution or in suspension in an inert liquid, for example benzene, to an acetyl number within the limits mentioned above.

The hydrotropic cellulose acetate forming the basis of the surface layer or layers, can, as indicated above, be made in a similar way to that for use in the basic layer except that ripening is continued considerably beyond the inception of acetone-solubility until, for instance, the cellulose acetate is soluble in 50% aqueous acetone or even in acetone containing a larger per cent of water, for example 60-75 or 80%. An alternative or additional expedient which may be adopted to obtain similar properties in the cellulose acetate for the surfacing layer is acetylation under such conditions that partial breaking down of the cellulose molecule occurs, for example the use of higher proportions of catalyst, higher temperatures and a lower proportion of diluent. A further expedient is to subject the cellulose from which the cellulose acetate is to be made to a preliminary treatment, for example with mineral acids, formic acid or mixtures thereof with acetic or other lower fatty acids, with a view to effecting some breaking down of the cellulose molecule before acetylation.

Plasticizers may be present in the outer as well as in the basic sheets. Plasticizers for the outer layer should preferably have at least some slight degree of affinity for water. Thus, highly water-resistant plasticizers such, for example, as tricresyl phosphate, tributyl phosphate and dibutyl phthalate, if employed at all in this layer, should preferably be in admixture with plasticizers having a greater affinity for water, for example dimethyl-, diethyl- and dibutyl-tartrates, dioxyethyl phthalate, ethyl acetanilide and sulphonamides and sulphonanilides, for example para-toluene sulphonamide. Among plasticizers particularly suitable for the basic layer are ether-esters such as diethoxyethyl phthalate and dimethoxyethyl phthalate. Other modifying agents (i. e. agents adapted to modify the mechanical properties of the sheet material) having an affinity for water may, with advantage, be present in both layers and particularly in the outer. Examples of such modifiers are high boiling alcohols, e. g. glycol, glycerol and diacetone alcohol and synthetic resins having an affinity for water, e. g. those obtainable (as described in British Patent No. 453,833 corresponding to U. S. Patent No. 2,153,585 by condensing an alcohol containing at least two hydroxy groups with hydroxy polycarboxylic acids, with formals of such acids or with fatty acid esters of such acids. Specially suitable are the condensation products of glycerol with citric acid and with methylene citric acid. Synthetic resins having little or no affinity for water, e. g. the condensation products of formaldehyde with polynuclear phenols such as diphenylol propane and with sulphonamides, e. g. para-toluene sulphonamide may also be present particularly in the basic layer.

The invention has been described above with particular reference to the use of cellulose acetate as the basis for the basic and outer sheets. This is not, however, essential. Thus, for example, the basic sheet may comprise cellulose nitrate, cellulose propionate, cellulose butyrate, cellulose acetate-propionate, cellulose acetate-butyrate, cellulose acetate-nitrate, cellulose propionate-nitrate, cellulose butyrate-nitrate, oxyethyl cellulose acetate, ethyl cellulose acetate, ethyl cellulose, benzyl cellulose or other water-resistant transparent film-forming substances, for example polymerized unsaturated compounds such as polyvinyl acetate, chloracetate or chloride, polymerised acrylic esters or alkyl substituted esters. Similarly, the outer sheet or sheets may be formed from any of the organic or mixed inorganic-organic esters referred to above, ripened or saponified to a point at which they have a reduced water-resistance without becoming water-soluble or capable of swelling to an undue extent in water. Substances similar to those referred to above but having a reduced water-resistance owing, for example, to partial breaking down of long molecular chains in their manufacture may be used in forming the superficial layer. It is of advantage for the ester or ether of the outer and basic layers to be formed from the same ester-forming or ether-forming components for said ester or ether or at least to be so similar in constitution as to have an affinity for one another. This facilitates union of the sheets and simplifies the choice of suitable plasticizers.

Although the process and products of the invention are of particular importance in connection with the manufacture of respirator eye-pieces, goggles and the like they have other applications, for example in the production of wind-screens or windows for closed vehicles, aircraft, gun turrets and the like. The products of the invention are capable of remaining undimmed for considerable periods even when exposed on one side to a saturated atmosphere at blood heat and on the other to a winter atmospheric temperature. The invention includes articles provided with eye-pieces or windows made by the methods described above, e. g. respirator face-pieces and goggles having such eye-pieces.

The following examples illustrate the invention:

Example 1

A hydrotropic cellulose acetate is made as follows:

100 parts of cellulose are pretreated for 12 hours at 30-40° C. with 100 parts of acetic acid. The mass is then added to a mixture, precooled to about 10° C., of 300 parts of acetic acid, 300 parts of acetic anhydride and 15 parts of sulphuric acid. Acetylation is allowed to continue until all the cellulose has dissolved, the temperature not being allowed to rise above about 20° C. 40-50 parts of water are then added and ripening is effected by allowing the mixture to stand at a temperature of 25-30° C. until a sample removed is soluble in a 40% aqueous solution of acetone. Premature precipitation during ripening is avoided by the addition of further quantities of water from time to time. The cellulose acetate is then precipitated by the addition of acetone, filtered, washed in acetone and dried.

From this cellulose acetate a solution of the following composition is made:

| | Parts |
|---|---|
| Cellulose acetate | 10 |
| Glycerol | 1 |
| Diethylene glycol | 3 |
| Dioxane | 20 |
| Water | 25 |

In this as in all the examples, all the parts are by weight.

The solution is flowed on to a sheet of thickness .04" and of the following composition:

| | Parts |
|---|---|
| Acetone-soluble cellulose acetate | 80-55 |
| Dimethyl phthalate | 20-45 |

The solvent is allowed to evaporate and the dry sheet is polished in a hot press. From the finished sheet, respirator eye-pieces can be cut. If desired, both sides of the sheet can be coated as described.

The solution of hydrotropic cellulose acetate may be replaced by any of the solutions of Examples 1-5 of U. S. application Serial No. 225,570 filed August 18, 1938.

Example 2

A sheet of thickness 0.015" is cast on a suitable film-forming surface from the solution of hydrotropic cellulose acetate specified in Example 1. This sheet is then wetted with an alcoholic solution of polyvinyl acetate of medium viscosity. A basic sheet of the thickness and composition of that in Example 1 is wetted with the same solution and the two sheets are then brought together with their wetted surfaces in contact. The assembly is pressed in a heated platten press to secure adhesion. During the pressing the alcohol is vaporised. The composite sheet obtained is suitable for the construction of observation panels of aircraft or windows of closed motors vehicles. In such use the sheet material is fixed with the surface of hydrotropic material inside.

Example 3

The process is carried out as in Example 1 except than 4-8 parts of the dimethyl phthalate are replaced by methylene citric acid glycerol resin and the solution of hydrotropic cellulose acetate has the following composition:

| | Parts |
|---|---|
| Cellulose acetate having its maximum solubility in 40% aqueous acetone | 20 |
| Methylene citric acid glycerol resin | 10 |
| Dioxane | 5 |
| Water | 50 |

The cellulose acetate is made as described in Example 1 ripening being continued until the specified solubility is obtained. The methylene citric acid glycerol resin is made by heating 20.4 parts of methylene citric acid with 6 parts of glycerol in an open vessel at 180° C. until the test sample gels when heated for 10 minutes at 185-190° C. in a closed tube in an oilbath as described in British Patent No. 453,833 corresponding to U. S. Patent No. 2,153,585. Instead of using methylene citric acid and glycerol, condensation may be effected in a similar way between citric acid glycerol and paraformaldehyde.

Instead of flowing the solution directly on to the basic sheet it may, as in Example 2, be flowed on to a suitable film-forming surface and the resulting sheet may then be stripped therefrom and united with the basic sheet under heat and pressure with the help of a suitable adhesive, for instance a solution of polyvinyl acetate in methanol or ethanol.

The solution of hydrotropic cellulose acetate may be replaced by either of the solutions of Examples 7 and 8 of U. S. application Serial No. 225,570 filed August 18, 1938.

Example 4

A sheet of thickness 0.015" and of the composition of the basic sheet in Example 3 is sprayed on both sides with a solution of the following composition:

| | Parts |
|---|---|
| Hydrotropic cellulose acetate | 20 |
| Methylene citric acid glycerol resin | 10 |
| Water | 100 |
| Dioxane | 100 |

The hydrotropic cellulose acetate is made as in Example 1. The composite sheet material is finished as described in Example 1.

In all the foregoing examples the hydrotropic cellulose acetate may be made by other methods than that described in Example 1, for example by the methods described in Examples 11 and 12 of U. S. application Serial No. 225,570 filed August 18, 1938.

The sheet materials of the invention may be shaped in any desired way. Thus, for example, curved observation panels for aircraft may be formed by cutting the sheet material to the necessary size and bending the material in a heated press to give the desired curvature. The edges of articles cut, punched or otherwise formed from the sheet materials of the invention may be protected by the application of a suitable cement, lacquer or the like but this is in general unnecessary.

Having described my invention what I desire to secure by Letters Patent is:

1. A transparent window closure for an article in the use of which said closure will be exposed to conditions of temperature and humidity tending to cause fogging by the condensation of moisture thereon, said closure comprising a layer of a water-resistant organic film-forming polymer that is an ester of an organic acid, and adherent thereto at least one outer layer of a hydrotropic film-forming polymer that is an ester of the same organic acid and the same alcohol as the water-resistant polymer.

2. A transparent window closure for an article in the use of which said closure will be exposed to conditions of temperature and humidity tending to cause fogging by the condensation of moisture thereon, said closure comprising a layer of a water-resistant organic film-forming polymer that is an ester of an organic acid, and adherent thereto at least one outer layer of a hydrotropic film-forming polymer that is an ester of the same organic acid and the same alcohol as the water-resistant polymer, said hydrotropic polymer being soluble in an aqueous solution of a suitable organic liquid containing at least 50% of water, but insoluble in water.

3. A transparent window closure for an article in the use of which said closure will be exposed to conditions of temperature and humidity tending to cause fogging by the condensation of moisture thereon, said closure comprising a layer of a water-resistant organic ester of cellulose, and adherent thereto at least one outer layer of a hydrotropic ester of cellulose derived from the same acid as the water-resistant ester but of lower acidyl value than said ester.

4. A transparent window closure for an article in the use of which said closure will be exposed to conditions of temperature and humidity tending to cause fogging by the condensation of moisture thereon, said closure comprising a layer of a water-resistant cellulose acetate, and adherent thereto at least one outer layer of a hydrotropic cellulose acetate of lower acetyl value than the water-resistant cellulose acetate.

5. A transparent window closure for an article in the use of which said closure will be exposed to conditions of temperature and humidity tending to cause fogging by the condensation of moisture thereon, said closure comprising a layer of a water-resistant cellulose acetate, and adherent thereto at least one outer layer of a hydrotropic cellulose acetate of lower acetyl value than the water-resistant cellulose acetate, said hydrotropic cellulose acetate being soluble in aqueous acetone containing at least 50% of water but insoluble in water.

6. A transparent window closure for an article in the use of which said closure will be exposed to conditions of temperature and humidity tending to cause fogging by the condensation of moisture thereon, said closure comprising a layer of a water-resistant organic film-forming polymer that is an ester of an organic acid, and adherent thereto at least one outer layer of a hydrotropic film-forming polymer that is an ester of the same organic acid and the same alcohol as the water-resistant polymer, said hydrotropic polymer being soluble in an aqueous solution of a suitable organic liquid containing at least 50% of water, but insoluble in water, the hydrotropic layer containing a water-soluble alcohol of high boiling point.

7. A transparent window closure for an article in the use of which said closure will be exposed to conditions of temperature and humidity tending to cause fogging by the condensation of moisture thereon, said closure comprising a layer of a water-resistant cellulose acetate, and adherent thereto at least one outer layer of a hydrotropic cellulose acetate of lower acetyl value than the water-resistant cellulose acetate, said hydrotropic cellulose acetate being soluble in aqueous acetone containing at least 50% of water but insoluble in water, and said hydrotropic layer containing glycerol.

8. A transparent window closure for an article in the use of which said closure will be exposed to conditions of temperature and humidity tending to cause fogging by the condensation of moisture thereon, said closure comprising a layer of a water-resistant organic ester of cellulose, and adherent thereto at least one outer layer of a hydrotropic ester of cellulose derived from the same acid as the water-resistant ester but of lower acidyl value than said ester, the hydrotropic layer containing a water-soluble condensation product obtainable by condensing an alcohol containing at least two hydroxy groups with a substance selected from the class consisting of hydroxy polycarboxylic acids, formals of such acids and fatty acid esters of such acids.

9. A transparent window closure for an article in the use of which said closure will be exposed to conditions of temperature and humidity tending to cause fogging by the condensation of moisture thereon, said closure comprising a layer of a water-resistant cellulose acetate, and adherent thereto at least one outer layer of a hydrotropic cellulose acetate of lower acetyl value than the water-resistant cellulose acetate, said hydrotropic cellulose acetate being soluble in aqueous acetone containing at least 50% of water but insoluble in water, and said hydrotropic layer containing a water-soluble methylene citric acid glycerol resin.

10. An article having a window and such that when in use said window is liable to be exposed on the inside to a moist warm atmosphere and on the outside to a colder atmosphere, said window having a transparent closure formed of composite sheet material which comprises a basic layer of a water-resistant organic film-forming polymer that is an ester of an organic acid, and adherent thereto a layer of a hydrotropic film-forming polymer that is an ester of the same organic acid and the same alcohol as the water-resistant polymer, the hydrotropic layer being on the inside of the article.

11. A respirator face-piece having an eye-piece of transparent composite sheet material which comprises a basic layer of water-resistant cellulose acetate and adherent thereto a layer of hydrotropic cellulose acetate, the hydrotropic layer being on the inside of the face-piece.

12. A respirator face-piece having an eye-piece of transparent composite sheet material which comprises a basic layer of water-resistant cellulose acetate and adherent thereto a layer of hydrotropic cellulose acetate which is soluble in aqueous acetone containing at least 50% of water but insoluble in water, the hydrotropic layer being on the inside of the face-piece.

WILLIAM HENRY MOSS.